United States Patent
Di Pasquale et al.

(10) Patent No.: US 7,024,071 B1
(45) Date of Patent: *Apr. 4, 2006

(54) LUMPED RAMAN AMPLIFIER FOR ADAPTIVE DISPERSION COMPENSATION

(75) Inventors: Fabrizio Di Pasquale, Milan (IT); Fabrizio Forghieri, Modena (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,847

(22) Filed: May 24, 2004

Related U.S. Application Data

(63) Continuation of application No. 09/944,244, filed on Aug. 30, 2001, now Pat. No. 6,798,945.

(51) Int. Cl.
*G02B 6/28* (2006.01)

(52) U.S. Cl. .......................... 385/24; 359/334
(58) Field of Classification Search ................. 385/24; 398/158, 159, 81, 79; 359/334, 330
See application file for complete search history.

(56) References Cited

U.S. PATENT DOCUMENTS

| | | | | |
|---|---|---|---|---|
| 5,283,686 | A | 2/1994 | Huber | 359/337 |
| 6,320,884 | B1 | 11/2001 | Kerfoot, III | 372/3 |
| 6,339,665 | B1 | 1/2002 | Danziger | 385/123 |
| 6,417,959 | B1 | 7/2002 | Bolshtyansky et al. | 359/334 |
| 6,417,961 | B1 | 7/2002 | Sun et al. | 359/337.5 |
| 6,433,921 | B1 | 8/2002 | Wu et al. | 359/334 |
| 2001/0008069 | A1 | 7/2001 | Junquera | 60/484 |
| 2001/0024721 | A1 | 9/2001 | Bohm | 428/355 |
| 2001/0040719 | A1 | 11/2001 | Okuno | 359/334 |
| 2002/0041430 | A1 | 4/2002 | Fludger | 359/334 |
| 2002/0159131 | A1 | 10/2002 | Bartolini | 359/334 |
| 2002/0159132 | A1 | 10/2002 | Grochocinski | 359/334 |

OTHER PUBLICATIONS

R. Sugizaki et al. "Slope Compensating DCF for S-band Raman Amplifier," 2001, Optical Society of America, Abstract OTuB6-1.

(Continued)

*Primary Examiner*—Andrew Schechter
*Assistant Examiner*—Richard H Kim
(74) *Attorney, Agent, or Firm*—Aka Chan LLP

(57) ABSTRACT

An adaptive dispersion compensation system that also achieves optical amplification by inducing Raman amplification effects in dispersion compensating fiber. This amplification/chromatic dispersion compensation architecture may be applied, e.g., at the end of an all-optical link, or an intermediate points along the link. By varying the length of dispersion compensating fiber used and the pump power, one may accommodate a wide range of dispersion compensation requirements as determined in the field. This scheme also provides all of the advantages typically provided by the use of Raman amplification.

14 Claims, 4 Drawing Sheets

OTHER PUBLICATIONS

S.A.E. Lewis et al., "Broadband high-gain dispersion compensating Raman amplifier," Jun. 22, 2000, IEE Electronic Letters Online No. 2001019.

S.A.E. Lewis et al., "Characterization of Double Rayleigh Scatter Noise in Raman Amplifiers," May 2000, IEEE Photonic Technology Letters, vol. 12, No. 5.

S.A.E. Lewis et al., "Low-Noise High Gain Dispersion Compensating Broadband Raman Amplifier," Femtosecond Optics Group, Imperial College Physics Department, London, Abstract TuA2-1/5.

R. Sugizaki et al. "Polarization insensitive broadband transparent DCF module with faraday rotator mirror, Raman-amplified by single polarization diode-laser pumping," Furukawa Electric Co., Ltd. Abstract TuS5-1/279.

J. Bromage et al. S-band all-Raman amplifiers for 40 x 10 Gb/s transmission over 6 x 100 km of non-zero dispersion fiber, Lucent Technologies, Holmdel, New Jersey, Abstract PD4-1.

M. Nissov "Rayleigh crosstalk in long cascades of distributed unsaturated Raman amplifiers," Electronics Letters, Jun. 10, 1999, vol. 35, No. 12, pp. 997-998.

LUMPED RAMAN AMPLIFIER FOR ADAPTIVE DISPERSION COMPENSATION

RELATED APPLICATIONS

This application is a continuation of U.S. patent application Ser. No. 09/944,244 entitled "LUMPED RAMAN AMPLIFIER FOR ADAPTIVE DISPERSION COMPENSATION", filed Aug. 30, 2001, now U.S. Pat. No. 6,798,945, which is hereby incorporated by reference.

BACKGROUND OF THE INVENTION

The present invention related to optical communication systems and more particularly to ameliorating the effects of transmission impairments including, e.g., chromatic dispersion.

The explosion of communication services, ranging from video teleconferencing to electronic commerce has spawned a new era of personal and business interactions. As evident in the rapid growth of internet traffic, consumers and businesses have embraced broadband services, viewing them as a necessity. However, this enormous growth in traffic challenges the telecommunication industry to develop technology that will greatly expand the bandwidth of communication networks. Further improvements in optical communications hold great promise to meet the demand for greater bandwidth.

Wavelength division multiplexing (WDM) technology permits the concurrent transmission of multiple channels over a common optical fiber, thus expanding available bandwidth and providing other advantages in implementation. Optimally exploiting the capabilities of WDM systems requires dealing with various transmission impairments. It is particularly desirable to transmit WDM signals over a very long range without conversion to electrical form and regeneration of the optical signal.

One important impairment is attenuation along the optical fiber and the resulting degradation of signal to noise ratio. To assure accurate data recovery, it is generally necessary to amplify the optical signal at intermediate points along the link and also at the end of the link.

The development of erbium-doped fiber amplifiers (EDFAs) has been a boon to the development of WDM systems. EDFA technology permits the simultaneous amplification of all wavelengths in a composite WDM signal. Using this type of amplification, the WDM composite signal may be transmitted large distances, e.g., more than 600 km, without regeneration.

Another important optical communication impairment to address is chromatic dispersion. The term "chromatic dispersion" refers to the phenomenon where different spectral components of an optical signal propagate through the fiber at different velocities. One unwanted consequence of this effect is that modulation pulses that encode data spread out in the time domain and begin overlapping one another leading to bit errors. The degree of chromatic dispersion varies depending on length and various physical characteristics of the fiber.

One known solution to the problem of chromatic dispersion compensation is to insert so-called chromatic dispersion compensating fiber into the transmission path. The chromatic dispersion compensating fiber deliberately introduces a chromatic dispersion that is opposite to the dispersion present in the transmission fiber. The chromatic dispersion is thus effectively cancelled out.

It is also known to combine optical amplification and chromatic dispersion compensation in an integrated system that may be used, e.g., at the end of a link or at intermediate points. In one such scheme, amplification is provided by two cascaded EDFA stages. Between the two EDFA stages, there is a dispersion compensation unit that incorporates dispersion compensating fiber. The use of two stages provides acceptable noise figure performance and sufficient amplification to make up for the insertion loss of the dispersion compensating fiber.

Drawbacks of this arrangement include limitations inherent in the use of EDFA technology for optical amplification. Most importantly, EDFAs offer good amplification performance only across a limited bandwidth that is insufficient to cover large numbers of WDM channels.

Another limitation, however, is that due to the need to tailor the degree of chromatic dispersion compensation to conditions in the field, it is difficult to provide an amplifier design that will offer good performance in all conditions. Consider that the overall combination of dispersion compensating fiber and two EDFA stages should provide a gain within specified constraints to satisfy receiver dynamic range requirements. Yet the degree of dispersion compensation required and therefore the length of dispersion compensating fiber employed will typically be determined based on measurements made on-site.

To accommodate this architecture to the wide range of attenuations introduced by field-customized dispersion compensation configurations, the EDFAs are designed to have gains that assume a maximum anticipated length of dispersion compensating fiber is inserted. To assure that maximum permissible gain is not exceeded where less than maximum dispersion compensation is required, field technicians are instructed to insert sufficient attenuation to simulate the loss of any omitted length of dispersion compensating fiber. Due to this otherwise unnecessary attenuation, noise figure suffers and cost increases.

What is needed are systems and methods for chromatic dispersion compensation and amplification that provide good performance over a range of field conditions. It is also desirable to accommodate the wide composite WDM signal bandwidths associated with large numbers of WDM channels.

SUMMARY OF THE INVENTION

One embodiment of the present invention provides an adaptive dispersion compensation system that also achieves optical amplification by inducing Raman amplification effects in dispersion compensating fiber. This amplification/chromatic dispersion compensation architecture may be applied, e.g., at the end of an all-optical link, or an intermediate points along the link. By varying the length of dispersion compensating fiber used and the pump power, one may accommodate a wide range of dispersion compensation requirements as determined in the field. This scheme also provides all of the advantages typically provided by the use of Raman amplification.

A first aspect of the present invention provides apparatus for compensating for chromatic dispersion in a WDM signal. The apparatus includes: a first dispersion compensating fiber traversed by the WDM signal where the first dispersion compensating fiber is pumped with pump energy to induce Raman amplification of the WDM signal, and a second dispersion compensating fiber traversed by the WDM signal after amplification in the first dispersion compensating fiber.

The second dispersion compensating fiber is pumped with pump energy to induce Raman amplification of the WDM signal.

A second aspect of the present invention provides a method for compensating for chromatic dispersion in an optical signal. The method includes passing the optical signal through a first dispersion compensating fiber and then through a second dispersion compensating fiber, pumping the first dispersion compensating fiber with pump energy to induce Raman amplification of the optical signal therein, and pumping the second dispersion compensating fiber with pump energy to induce Raman amplification of the optical signal therein.

Further understanding of the nature and advantages of the inventions herein may be realized by reference to the remaining portions of the specification and the attached drawings.

DESCRIPTION OF SPECIFIC EMBODIMENTS

The present invention is directed towards systems and methods for chromatic dispersion compensation and/or optical amplification. One particular application is a WDM optical communication link wherein chromatic dispersion compensation and/or amplification of a composite WDM signal may be necessary at the end of the link and at intermediate points along the link. The degree of amplification required will be determined by a gain budget prepared for the overall link taking into account loss and receiver dynamic range requirements. The degree of chromatic dispersion compensation required will depend on the type and length of fiber used to implement the link as well as measurements made in the field. This application is merely representative and the present invention may be implemented wherever applicable.

In one particular example, the present invention is applied to a WDM communication system employing 200 WDM channels spaced 25 GHz apart in a wavelength range between 1570 nm and 1610 nm. The total input power to the chromatic dispersion compensation and amplification system is on the order of 8 dBm or −15 dBm per channel. The desired output power may be 18 dBm. It is also desirable that the noise figure achieved be less than 6 dB, that the signal to noise ratio due to double Rayleigh back-scattering should be greater than 50 dB, and that the four wave mixing-induced cross talk be less than −48 dB. It is also desirable to incorporate the capability to compensate for chromatic dispersion levels ranging between 310 and 1970 ps/nm. These criteria will satisfy the requirements for implementing spans that are between 50 and 100 km in length.

Figure 1:
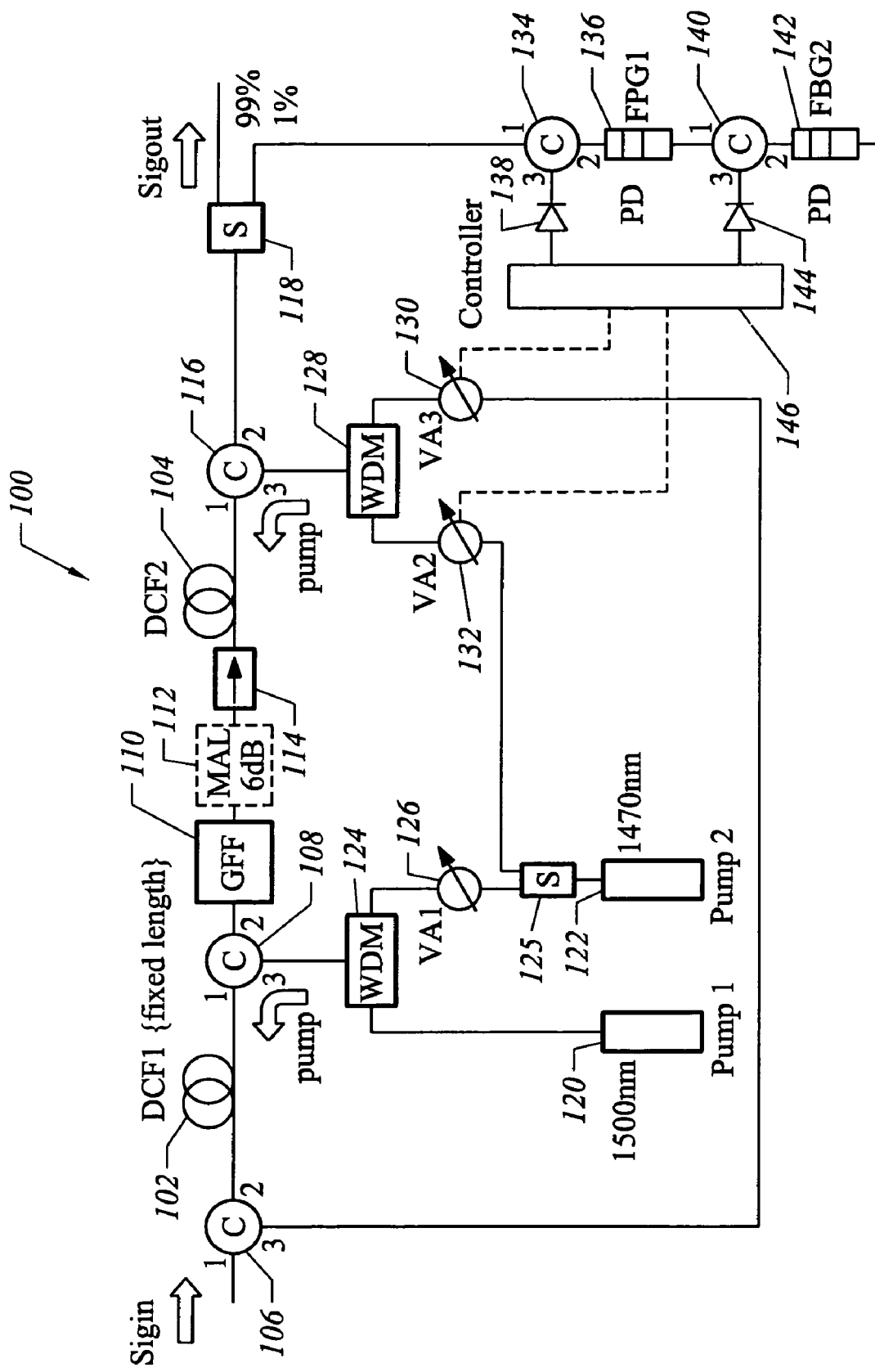
FIG. 1 depicts a chromatic dispersion compensation and amplification system according to one embodiment of the present invention.

FIG. 1 depicts a chromatic dispersion compensation and amplification system 100 according to one embodiment of the present invention. System 100 may be deployed, e.g., after each span along the link. Chromatic dispersion compensation is achieved by two spools of dispersion compensating fiber 102 and 104. According to the present invention, Raman amplification effects are also achieved in dispersion compensating fiber spools 102 and 104 by appropriate injection of pump energy so that each spool implements a lumped Raman amplifier (LRA).

A WDM signal to be amplified and chromatic dispersion compensated enters system 100 via port 1 of a three-port circulator 106. The composite WDM signal exits circulator 106 via port 2 which is coupled to one end of dispersion compensating fiber spool 102. As will be explained below, Raman amplification is obtained within dispersion compensating fiber spool 102. After exiting dispersion compensating fiber spool 102, the WDM signal enters port 1 of a circulator 108 and exits via port 2 to encounter a gain flattening filter 110. The response characteristics of gain flattening filter 110 will depend in part on the type of optical fiber used in the link.

Following gain flattening filter 110, there is an optional medium access loss (MAL) that is preferably included in systems employing conventional single-mode fiber (e.g., G-652 fiber as known in the art), but preferably omitted in systems employing non-zero dispersion shifted fiber (G-655). MAL 112 incorporates an attenuator and depending on the application, may also incorporate additional dispersion compensating fiber. MAL 112 has an insertion loss of 6 dB in the depicted example. An isolator 114 follows MAL 112 and blocks counter-propagating pump energy used in dispersion compensating fiber spool 104. Following further amplification in dispersion compensating fiber spool 104, the WDM signal enters port 1 of a circulator 116 and exits via port 2 to encounter a splitter 118. Splitter 118 has two outputs, a principal output energized with 99% of the input of the splitter input power level and a monitoring output that taps off 1% of the splitter input power.

For the example application, the length of dispersion compensating fiber in spool 102 is fixed at 2 km. The length of fiber in spool 104 is preferably fixed at 5.8 km in G-652 fiber systems and is preferably of variable length in G-655 fiber systems. Dispersion compensating fiber spool 102 is preferably pumped with 660 mW of laser pump power at 1470 nm and 610 mW at 1500 nm. This pumping occurs in a counter-propagating direction. Residual pump power at 1500 nm from spool 102 is multiplexed with a fraction of the pump power at 1470 nm and coupled into spool 104.

Details of the pump generation and distribution scheme will now be explained with reference to FIG. 1. A pump 120 outputs 610 mW at 1500 nm. A pump 122 generates pump energy at 1470 nm. For fiber spool 102, a WDM multiplexer 124 multiplexes two pump sources together for injection into spool 102 via circulator 108. All of the output of pump 120 is injected into fiber spool 102. The output of pump 122 passes through a splitter 124 and a variable attenuator 126 before reaching WDM multiplexer 124. Variable attenuator 126 is used to adjust the 1470 nm pump power for dispersion compensating fiber spool 102 to be 660 mW even though the actual power output of pump 122 may vary depending on the desired pump power for dispersion compensating fiber spool 104.

Pump energy for dispersion compensating fiber spool 104 is injected in a counter-propagating direction via circulator 116. A wavelength division multiplexer 128 multiplexes two pump wavelengths together. The source for the 1500 nm pump energy injected into dispersion compensating fiber spool 104 is residual pump energy that exits dispersion compensating fiber 102 by entering circulator 106 via port 2 and then exiting circulator 106 via port 3. This residual 1500 nm pump energy is coupled into wavelength division multiplexer 128 via a variable attenuator 130. The pump energy at 1470 nm that is directed to dispersion compensating fiber 104 is coupled to wavelength division multiplexer 128 via a variable attenuator 132. Pump power levels into dispersion compensating fiber spool 104 are adjusted to achieve a desired gain for system 100 taking into account losses introduced by the length of chromatic dispersion compensating fiber used.

A dynamic gain control mechanism may be implemented by extracting and processing two reference WDM channels within the Raman amplification bandwidth in accordance with a technique disclosed in U.S. patent application Ser. No. 09/717,036, filed on Nov. 22, 2000, the contents of which are herein incorporated by reference in their entirety for all purposes. To implement this technique, amplified optical signal energy from the monitoring output of splitter 118 is coupled into a circulator 134 via port 1. Signal energy at the first reference channel will exit circulator 134 via port 2 and then reflect from an appropriately configured fiber Bragg grating 136. The reflected energy reenters circulator 134 via port 2, exits via port 3, and then encounters a monitoring photodiode 138. Optical energy at the second reference channel will pass through fiber Bragg grating 136 to enter a circulator 140 via port 1 and then exit circulator 140 via port 2 to encounter a fiber Bragg grating 142 configured to reflect energy at the second reference channel. Optical energy at the second reference channel reenters circulator 140 via port 2 and exits via port 3 to encounter a monitoring photodiode 144. A controller 146 adjusts the attenuation levels of attenuators 130 and 132 in response to the electrical monitoring signals developed by photodiodes 138 and 144. Controller 146 may employ any suitable control algorithm including an algorithm as described in U.S. patent application Ser. No. 09/717,036.

The present invention will now be described in further detail with reference to particular types of optical fiber that may be employed in a link. One application is an all-optical WDM communication link employing G-655 fiber. Such a link may, e.g., include multiple spans having lengths of, e.g., 50–100 km with the system depicted in FIG. 1 being applied between spans and at the end of the link. Examples of the fiber employed may include TW-RS™ available from Lucent Technologies or the E-LEAF™ fiber available from Corning. For each span, the accumulated total chromatic dispersion may vary from 310 ps/nm to 780 ps/nm.

Figure 3:
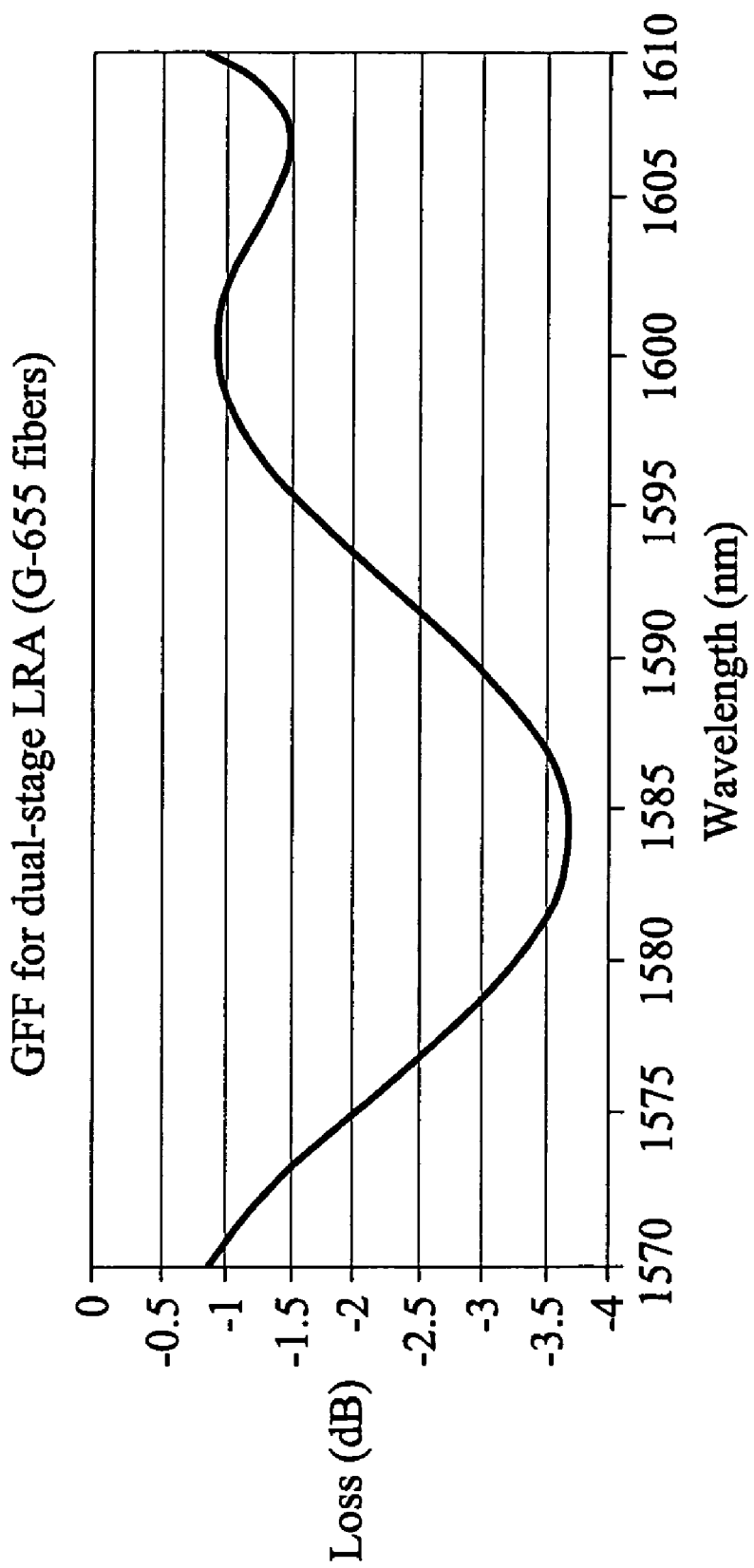
FIG. 3 depicts a filter response graph for a gain-flattening filter used in implementations of FIGS. 1–2 that are directed to systems employing non-zero dispersion shifted fiber (G-655).

For this application, one may set the length of the dispersion compensating fiber in spool 102 to be 2 km and employ a variable length of dispersion compensating fiber for spool 104 between, e.g., 1.1 km to 5.8 km, depending on measured chromatic dispersion conditions in the field. One should use dispersion compensating fiber that adds the appropriate RDS (ratio of dispersion over slope) for the transmission fiber that is being used. The output power in the first stage amplifier implemented by spool 102 is approximately 20 dBm and the output power of system 100 is approximately 18 dBm. For G-655 fibers MAL 112 is not included in the chain. The gain provided by the second amplification stage implemented by spool 104 is approximately 2 dB. FIG. 3 depicts the frequency response of gain flattening filter 110 as would be applied to a G-655 fiber link.

The system of FIG. 1 may be implemented either with or without dynamic gain control. In a particular example where the pump power for the first stage is 660 mW for 1470 nm and 610 mW at 1500 nm and the pump power for the second stage is 120 mW and 75 mW at 1470 nm and 1500 nm respectively, the net Raman gain for both stages will vary with the length of dispersion compensating fiber included in spool 104 and with wavelength. For a length of 1.1 km, net Raman gain varies between 9.4 and 10.0 dB depending on wavelength. For length of 104 of 2.6 km, 4.2 km, or 5.8 km, gains vary between 10.1 and 10.6 dB. Depending on wavelength and the amount of dispersion compensating fiber included in spool 104 (between 1.1 km and 5.8 km), the noise figure varies between 4 dB and 4.5 dB. Also, the optical signal to noise ratio (OSNR) due to double Rayleigh scattering varies between 52.5 and 57 dB depending on wavelength and the length of dispersion compensating fiber.

These figures of merit may be improved by using gain control as depicted in FIG. 1. For configurations where spool 104 includes 5.8 km of dispersion compensating fiber and is pumped with 120 mW at 1470 nm and with 75 mW of pump power at 1500 nm, net Raman gain is relatively flat across wavelength at approximately 10.4 dB, noise figure varies over wavelength between 4.1 and 4.5 dB and OSNR due to double Rayleigh scattering varies between 52.5 and 55.5 dB. For configurations where spool 104 includes 1.1 km of dispersion compensating fiber and is pumped with 150 mW at 1470 nm and 135 mW at 1500 nm, net Raman gain varies between 10 and 10.6 dB, and noise figure varies between 4 and 4.35 dB. It will be appreciated that the use of gain control permits system 100 of FIG. 1 to meet all of the amplifier objectives set out for the example application.

Figure 4:
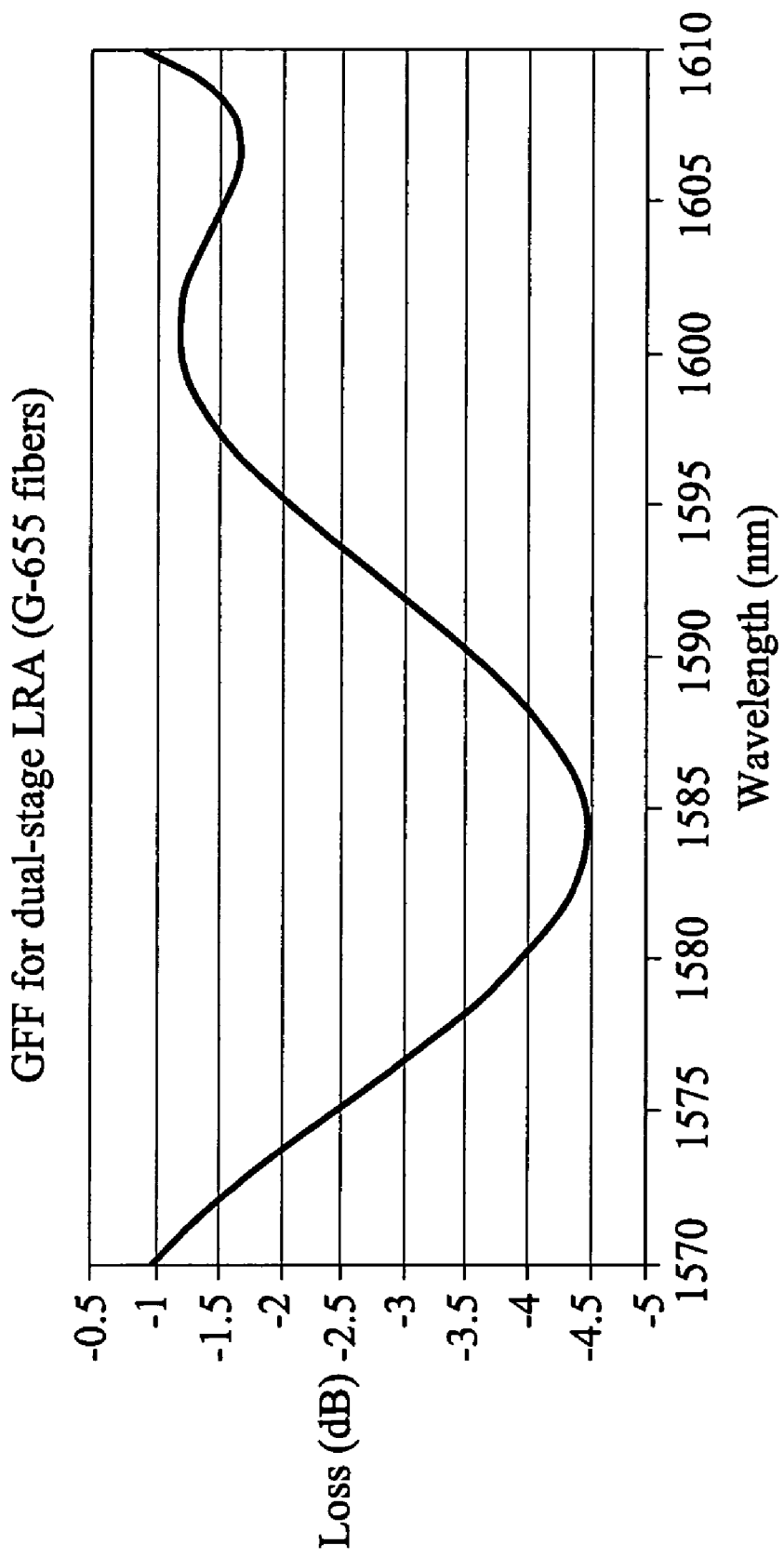
FIG. 4 depicts the response of a gain flattening filter used in implementations of FIGS. 1–2 that are directed to systems employing conventional single mode fiber (G-652).

The application of system 100 to WDM systems exploiting G-652 fiber will now be considered. Again consider an all-optical WDM link including multiple spans having lengths of 50–100 km where system 100 may be used between the spans and at the end of the link. Accumulated total dispersion can vary from 985 ps/nm to 1970 ps/nm. As with the G-655 fiber implementation, spool 102 includes 2 km of dispersion compensating fiber. For the G-652 application, spool 104 preferably includes a fixed length of 5.8 km of dispersion compensating fiber. MAL 112 is included and has an insertion loss of 6 dB. The dispersion compensation provided by spools 102 and 104 is supplemented by a variable length of passive dispersion compensating fiber within MAL 112. This variable length of dispersion compensating fiber within MAL 112 varies in length between 2 and 12 km and is adjusted in the field. Attenuation within MAL 112 is adjusted to compensate for the amount of fiber used. Note that this attenuation is smaller than that used in prior art EDFA schemes and thus there is less impact on noise figure. Gain flattening filter 110 has the filter response depicted in FIG. 4.

Due to the increased insertion loss introduced by the MAL, the second stage amplifier must provide a higher gain than was the case with the G-655 fiber implementation. Here, spool 104 is pumped to achieve a gain of approximately 8 dB. The shift in gain distribution causes increased noise figure and an increase of double Rayleigh scattering induced noise. For this implementation gain varies between approximately 10.3 and 10.5 dB. Noise figure varies between approximately 5.1 and 5.8 dB, and OSNR due to double Rayleigh scattering varies between 50 and 52.5 dB. This again satisfies the amplifier objectives. It is also been found that four wave mixing cross talk may be maintained at less than −48 dB for system 100 for both the G-655 and G-652 implementations.

Figure 2:
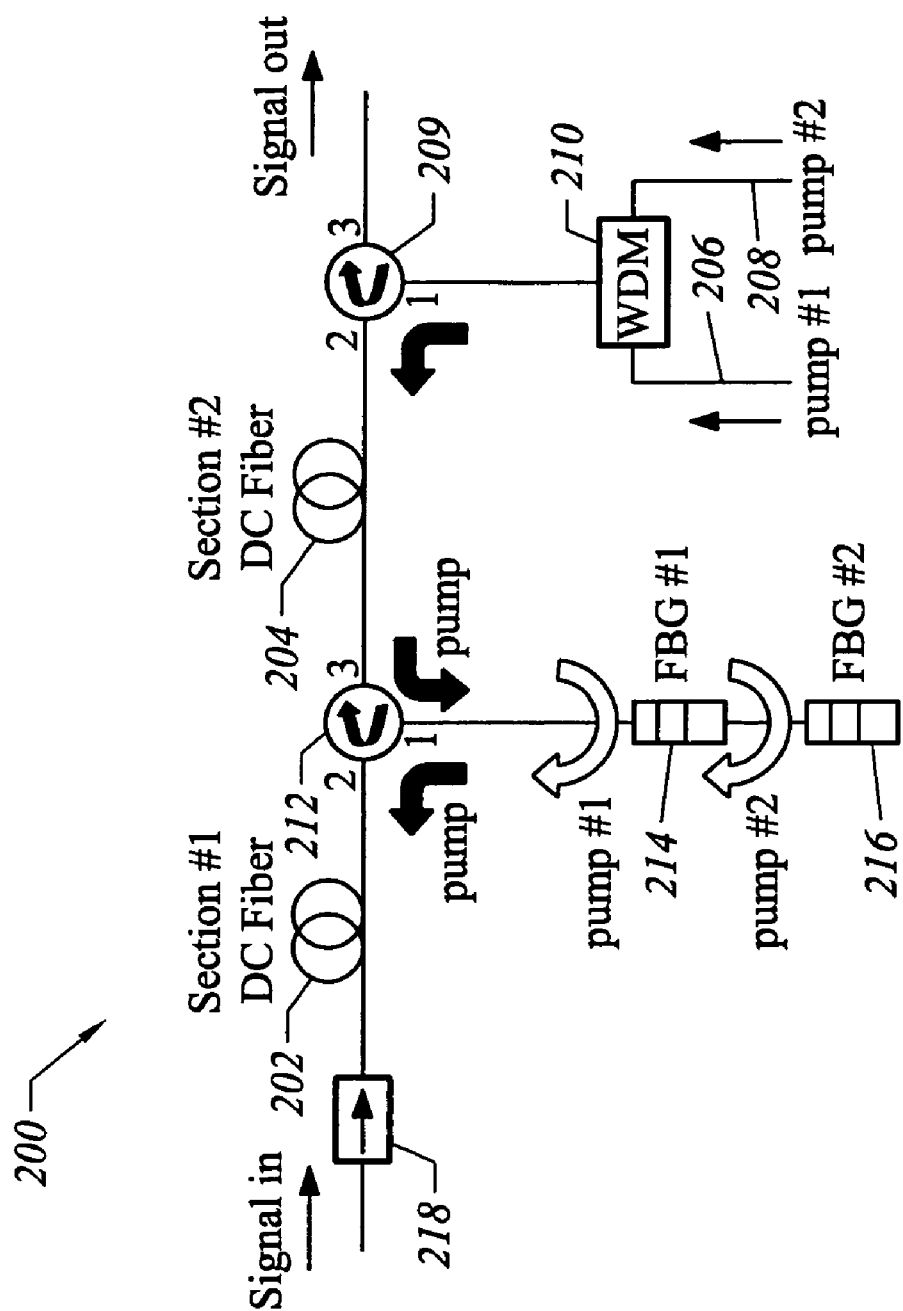
FIG. 2 depicts an enhancement to the embodiment of FIG. 1 according to the present invention.

FIG. 2 depicts a supplemental dispersion compensation system 200 that may advantageously substitute for MAL 112. The substitute of system 200 for MAL 112 is particularly advantageous in G-652 fiber applications. As discussed above for G-652 fiber applications, MAL 112 will typically incorporate unpumped dispersion compensating fiber. In system 200, this dispersion compensating fiber is pumped to induce amplification and make up for attenuation introduced by the additional fiber length. This provides an improvement in noise figure performance.

In system 200, the additional dispersion compensating fiber is divided into two spools 202 and 204. Optical energy from pump 206 (1500 nm) and pump 208 (1470 nm) is pumped into spool 204 in a counter-propagating mode. Pump 206 and pump 208 may be replaced by optical components tapping off pump energy from pumps 120 and 122 in FIG. 1. In accordance with the technique disclosed in co-assigned U.S. patent application Ser. No. 09/929,738, entitled. SUPPRESSION OF DOUBLE RAYLEIGH BACKSCATTERING AND PUMP REUSE IN A RAMAN AMPLIFIER, filed on Aug. 13, 2001, the contents of which are incorporated herein by reference in their entirety for all purposes, the residual pump energy from spool 204 is pumped into spool 202, also in a counter-propagating mode.

Now describing the pump energy distribution scheme of system 200 in greater detail, a wavelength division multiplexer 210 multiplexes the two pump signals together for injection into fiber spool 204 via a circulator 209, entering circulator 209 via port 1 and exiting via port 2. The pump energy counter-propagates through dispersion compensating fiber spool 204 before reaching port 3 of a circulator 212. The pump energy enters circulator 212 via port 3 and exits via port 1 to encounter a fiber Bragg grating 214 which is optimized to reflect energy at 1500 nm, the pump frequency of pump 206. Optical energy at other wavelengths encounters a second fiber Bragg grating 216 which is optimized to reflect optical energy at 1470 nm, the wavelength of pump 208. All other optical energy passes through both fiber Bragg grating 214 and fiber Bragg grating 216. Thus, energy at the pump frequencies is reflected back into circulator 212 via port 1 and on into fiber spool 202 via port 2 of circulator 212. Thus, the pump energy of both pumps is injected into both fiber spools in a counter-propagating mode. An isolator 218 blocks further counter-propagation of the pump energy. The signal energy forward propagates between the two fiber spools by entering circulator 212 via port 2 and exiting via port 3.

When system 200 is employed in G-652 fiber applications, the length of spools 202 and 204 are set in accordance with chromatic dispersion compensation requirements. The pump powers are set so that these spools are transparent, i.e., introduce no attenuation losses or gain.

The chromatic dispersion compensation and amplification system provided by the present invention thus accomplishes the needed chromatic dispersion compensation in a flexible way while providing good amplification performance. The use of the lumped Raman amplifier also allows for excellent performance considering amplifier figures of merit such as noise figure, double Rayleigh scattering, induced noise and four wave mixing cross talk.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the gains, power levels, fiber lengths, pump wavelengths, number of pumps and other parameters are merely indicative of a representative example and other values may be substituted within the scope of the present invention.

What is claimed is:

1. In a WDM communication system, apparatus for compensating for chromatic dispersion in a WDM signal, said apparatus comprising:
    a first dispersion compensating fiber traversed by said WDM signal, said first dispersion compensating fiber pumped with pump energy to induce Raman amplification of said WDM signal; and
    a second dispersion compensating fiber in cascade with said first dispersion compensating fiber; and
    a first laser pump providing pump energy on a first wavelength to said first dispersion compensating fiber and said second dispersion compensating fiber; and
    wherein said pump energy provided by said first laser pump traverses said second dispersion compensating fiber before entering said first dispersion compensating fiber via a Bragg fiber grating that reflects optical energy at said first wavelength and transmits other optical energy.

2. The apparatus of claim 1 further comprising a gain-flattening filter connected between said first dispersion compensating fiber and said second dispersion compensating fiber.

3. The apparatus of claim 1 further comprising an attenuator connected between said first dispersion compensating fiber and said second dispersion compensating fiber.

4. The apparatus of claim 1 further comprising a power control loop that performs power measurements on output of said second dispersion compensating fiber and adjusts a power level of pump energy directed to at least one of said first dispersion compensating fiber and said second dispersion compensating fiber.

5. The apparatus of claim 1 further comprising a second laser pump providing pump energy on a second wavelength to said first dispersion compensating fiber and said second dispersion compensating fiber.

6. In an optical communication system, a method for compensating for chromatic dispersion in an optical signal, said method comprising:
    passing said optical signal through a first dispersion compensating fiber and then through a second dispersion compensating fiber;
    pumping said first dispersion compensating fiber with pump energy to induce Raman amplification of said optical signal therein; and
    pumping said second dispersion compensating fiber with pump energy to induce Raman amplification of said optical signal therein; and
    employing a first laser pump providing pump energy on a first wavelength to said first dispersion compensating fiber and said second dispersion compensating fiber; and
    wherein said pump energy provided by said first laser pump traverses said second dispersion compensating fiber before entering said first dispersion compensating fiber via a Bragg fiber grating that reflects optical energy at said first wavelength and transmits other optical energy.

7. The method of claim 6 further comprising filtering said optical signal between said first dispersion compensating fiber and said second dispersion compensating fiber for equalization of spectral content of said optical signal.

8. The method of claim 7 further comprising attenuating said optical signal between said first dispersion compensating fiber and said second dispersion compensating fiber.

9. The method of claim 7 further comprising:
performing power measurements on output of said second dispersion compensating fiber; and
adjusting a power level of pump energy directed to at least one of said first dispersion compensating fiber and said second dispersion compensating fiber in response to said power measurements.

10. The method of claim 9 further comprising employing a second laser pump providing pump energy on a second wavelength to said first dispersion compensating fiber and said second dispersion compensating fiber.

11. In an optical communication system, apparatus for compensating for chromatic dispersion in an optical signal, said method comprising:
means for passing said optical signal through a first dispersion compensating fiber and then through a second dispersion compensating fiber;
means for pumping said first dispersion compensating fiber with pump energy to induce Raman amplification of said optical signal therein; and
means for pumping said second dispersion compensating fiber with pump energy to induce Raman amplification of said optical signal therein; and
means for employing a first laser pump providing pump energy on a first wavelength to said first dispersion compensating fiber and said second dispersion compensating fiber; and
wherein said pump energy provided by said first laser pump traverses said second dispersion compensating fiber before entering said first dispersion compensating fiber via a Bragg fiber grating that reflects optical energy at said first wavelength and transmits other optical energy.

12. The apparatus of claim 11 further comprising means for filtering said optical signal between said first dispersion compensating fiber and said second dispersion compensating fiber for equalization of spectral content of said optical signal.

13. The apparatus of claim 11 further comprising means for attenuating said optical signal between said first dispersion compensating fiber and said second dispersion compensating fiber.

14. The apparatus of claim 11 further comprising:
means for performing power measurements on output of said second dispersion compensating fiber; and
means for adjusting a power level of pump energy directed to at least one of said first dispersion compensating fiber and said second dispersion compensating fiber in response to said power measurements.

* * * * *